United States Patent [19]
Leclercq

[11] 3,907,259
[45] Sept. 23, 1975

[54] EXTRUSION MACHINE

[75] Inventor: Daniel Jules Leclercq, Paris, France

[73] Assignee: Societe des Establissements Andouart, Bezons, France

[22] Filed: Jan. 10, 1973

[21] Appl. No.: 322,275

[52] U.S. Cl................................. 259/192; 259/41
[51] Int. Cl.² ......................................... B29B 1/10
[58] Field of Search ............ 259/6, 21, 41, 64, 104, 259/192, DIG. 8; 425/204, 205, 208

[56] References Cited
UNITED STATES PATENTS

| | | | |
|---|---|---|---|
| 3,349,725 | 10/1967 | Bini.................................. | 259/64 X |
| 3,403,894 | 10/1968 | Matsuoka .......................... | 259/104 |
| 3,667,733 | 6/1972 | Fritsch................................ | 259/6 |

*Primary Examiner*—Harvey C. Hornsby
*Assistant Examiner*—Alan Cantor
*Attorney, Agent, or Firm*—Diller, Brown, Ramik & Wight

[57] ABSTRACT

The extrusion machine according to the invention is of the type comprising two independent screws adapted to cross each other while remaining substantially tangential, means for separately driving said screws in opposite directions from a single driving source, means for housing said screws in a cylindrical body, and a passage chamber at the crossing point of said screws and forming a communication between said screws, said machine further comprising a first cylindrical body arranged to receive at least one pair of parallel imbricated screws immobilized axially by one or more thrust bearings provided at each extremity of said cylindrical body, and a second cylindrical body housing an extrusion screw, communicating with said pair of imbricated screws, and delivering into an extrusion head.

The invention is especially intended for the production of extruded articles of plastic material such as large diameter plastic pipes, the said pair of screws serving first to mix and jellify the plastic material which is then conveyed under pressure by the extrusion screw towards an extrusion head.

16 Claims, 9 Drawing Figures

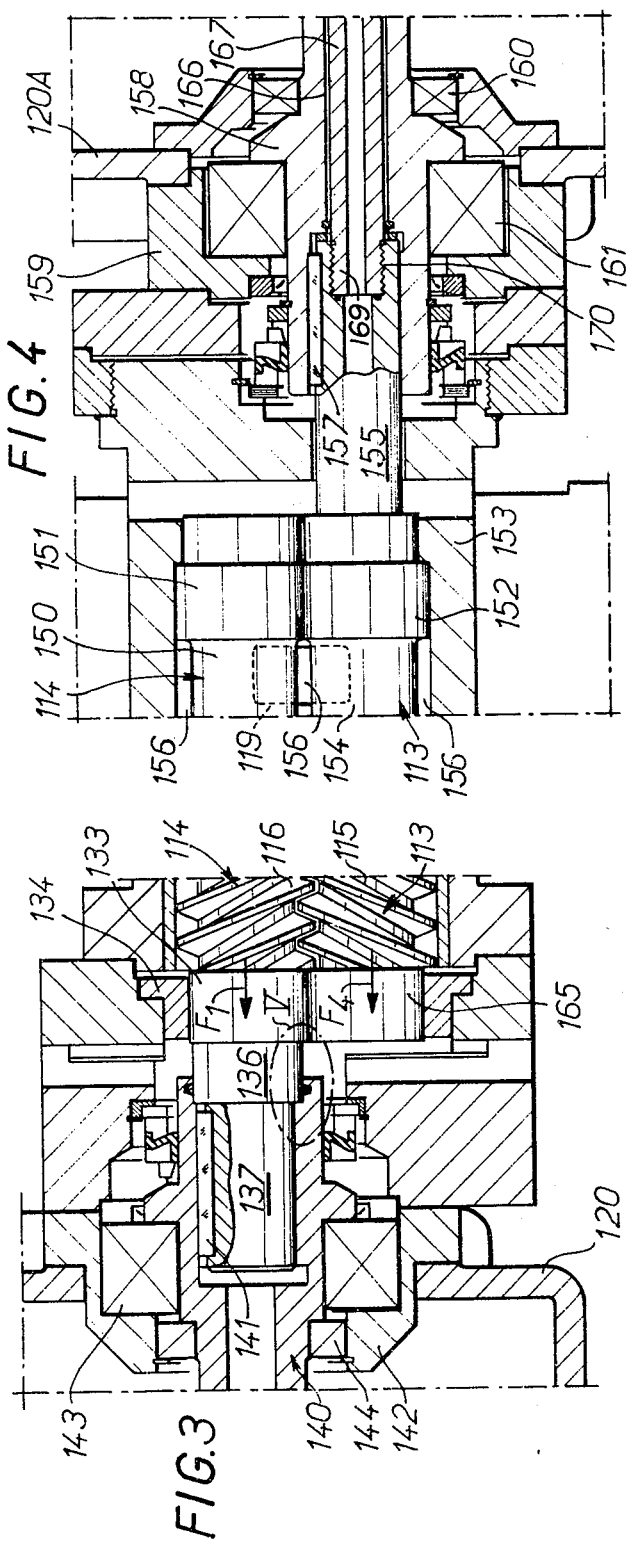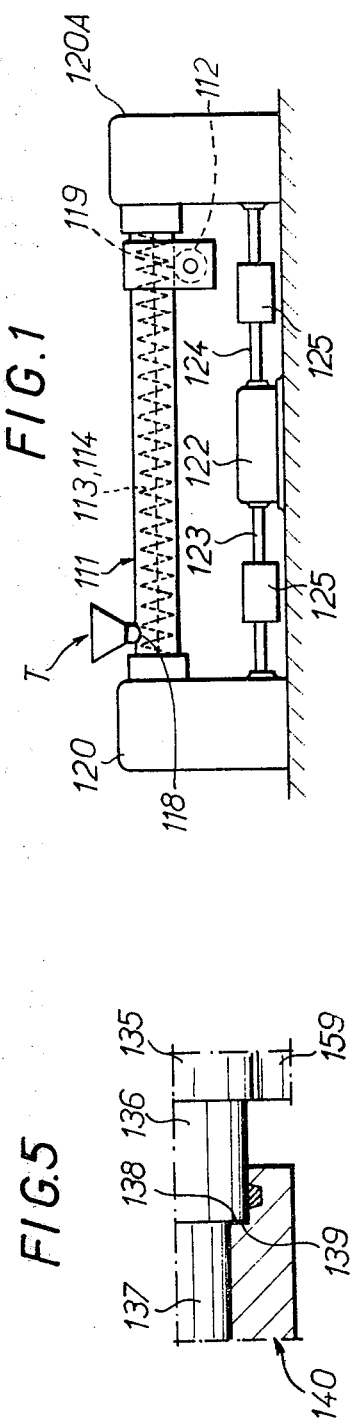

EXTRUSION MACHINE

The present invention relates to an extrusion machine for plastic material.

Various types of extrusion machines for plastic material are doubtless already known.

Generally speaking, extruding machines for plastic material have already been proposed which comprise an extrusion screw rotatably mounted in a body and adapted to ensure the conversion and the conveyance of the material.

Extrusion screws for plastic material having one or a plurality of sections have already been proposed with the interposition between at least two sections of deaerating means for the jellified material.

In machines of this kind, the extrusion of the plastic material under high pressure is effected by means of an extrusion head placed at the end of the screw, while at its other extremity the extrusion screw is coupled to appropriate driving means.

Experience has shown that with such arrangements, the operations of jellification and extrusion are interdependent, which is undesirable since the conditions of working of the material are completely different before and after conversion.

With the object of obtaining better results, it has also been proposed to give the single extrusion screw two different outlines in the two successive working zones.

In this case also, it was found that the conditions of working of the material and extrusion were still interdependent.

In order to overcome this difficulty, it was then proposed to constitute an extrusion machine comprising two separate screws, each having its independent drive, and each comprising its own supply and evacuation devices.

Various possibilities have been considered. Thus, extrusion machines have been provided with two independent screws arranged one after the other along an axis line common with an intermediate de-aeration zone.

According to one arrangement which is also known, extrusion machines have been proposed with two independent screws following each other with axes which are parallel but displaced with respect to each other, the intermediate zone being utilized as a de-aeration means.

These technical arrangements, although not devoid of interest, have however the major drawback of having a discontinuity which is unfavorable to the treatment of the material on the one hand and which results in complicated and bulky construction on the other.

For the purpose of improving the characteristics of the product obtained and the rate of production, there have also been proposed extrusion machines for plastic material which comprise, in an extrusion body, a pair of screws with parallel axes, imbricated and rotatably mounted in opposite directions. In machines of this kind, the supply of powder or granules is effected at one extremity and the extrusion of the product is carried out at another extremity by an extrusion head arranged in the extension of the said screws.

Machines of this kind, which will be termed the double-screw type, generally give satisfaction on two main points. In fact, while the supply of powdered mixtures to a single-screw extrusion machine causes absorption problems which can only be solved by relatively complicated auxiliary devices, this same feeding operation is facilitated by the meshing effect generated by the rotation in opposite directions of the pair of screws of a double extrusion machine, which results in a largely-positive pumping action.

In addition, it should be noted that an extrusion machine with a pair of screws has a better power efficiency for the conversion of the material, which makes it possible, for an equal output, to use on such a type of extrusion machine an amount of power less than that which it is necessary to supply for a similar result on single-screw extrusion machines.

Experience has proved however that this type of extrusion machine does not give complete satisfaction, especially as regards its construction, which does not permit high extrusion pressures to be developed, as is the case for example in the production of tubes which must comply with particularly severe safety characteristics.

It has been established that an extrusion machine provided with a pair of screws, by the very nature of its construction cannot be equipped with a set of abutments which are as strong as desirable. In fact, the small distance between centres of the two screws limits the diameter of the said abutments and in consequence reduces their dynamic load capacity, and the recommended provision of more or less complicated devices is not such as to resolve the problem stated above in a reliable and simple manner.

Furthermore, in these double-screw machines, it has been observed that the junction of the two streams of plastic material at the outlet of the screws constitutes a delicate point which up to the present time has not found any adequate solution. An additional element further complicates this problem, and this resides in the fact that is most cases the two streams do not have identical characteristics either as regards flow-rate or viscosity.

Taking the foregoing observations into account, it will be understood that, at the outlet of the extrusion head, the extruded product has a structure which is not uniform and which may subsequently lead to serious consequential incidents.

The present invention has for its object to remedy the disadvantages briefly enumerated above, and proposes for that purpose an extrusion machine which, in addition to a simple and robust construction, has an operation which gives products free from any defect of manufacture.

The extrusion machine according to the invention is essentially characterized by the fact that it comprises, on the horizontal, a first upper cylindrical body housing a pair of mixing screws, and perpendicularly or substantially perpendicular to this first body, a second lower cylindrical body which is associated therewith and houses at least one extrusion screw, the said screws being directly in communication at the crossing point, so that the material, first mixed and then jellified by the pair of screws, is transferred and then conveyed under pressure by the extrusion screw towards an extrusion head.

According to one particular feature of the invention, each of the screws of the said pair has its own driving means, preferably derived from a single motor having two axial output shafts of opposite orientation, the said screws being similar and arranged head-to-tail inside the body, and having their free end portions outside the body equipped so as to co-operate with reduction gears connected to the said driving means and arranged in opposition, while the cylindrical body is arranged so as to constitute internally an abutment for the other opposite end portions of the said screws.

An arrangement of this kind offers numerous advantages, both as regards manufacture which is considerably simplified, and as regards the rates and the quality of production which are improved in a substantial manner.

In fact, the individual drive of each of the screws in opposite directions permits of a construction having a strength which is practically equal to any test permitting a free driving couple on each screw.

It is thus possible to dispense completely with intermediate supply devices, due to the fact that the product to be mixed may be directly transferred from the hopper in which it is stocked, up to the screws, without any risk of excessive cramming or pressure.

According to another important advantage of the invention, the structure of the extrusion machine permits the use of standard equipment, especially as regards the above-mentioned reduction gear units, which reduces the production costs and facilitates maintenance of the whole unit.

According to a further important special feature of the invention, the second cylindrical body is suspended from the first, the latter being in turn fixed by means of supporting members on vertical orientation pillars forming the casing of the reduction gear units.

An extrusion machine thus produced makes it possible to associate the qualities inherent in the extrusion technique of the double-screw principle with that of single-screw extrusion, while eliminating their respective disadvantages or their difficult points, as has been previously explained.

Various advantages result from an arrangement of this kind.

In the first place, the absorption of material is effected by the pair of screws in a positive and uniform manner.

In the second place, there is a particularly attractive possiblity of providing each of the screws of the extrusion machine, whether it is the pair of mixing screws or the extrusion screws which are concerned, with abutments capable of absorbing very large dynamic loads with particularly appreciable margins of safety; this result is possible by virtue of the fact that the arrangement adopted enables the second cylindrical body of a single-screw extrusion machine to be fed, not from a material outlet at the end of the screw, but through a lateral outlet perpendicular to the axis of the pair of screws, which furthermore is more logical for the flow of the material.

In the third place, the end extrusion screw which takes the material coming from the pair of screws, has a homogenizing function on the material which is well suited to this type of machine.

In the fourth place, the association in series of two extrusion machines driven by separate and independent driving means gives the extrusion machine great flexibility of use, while ensuring for example in the transfer zone between the pair of mixing screws and the extrusion screw, a de-aerating operation which is particularly effective.

In the fifth place, the machine according to the invention further provides an easy access to the abutments, at the same time facilitating the dismantling of the screw assembly.

Finally, it should be noted that the extrusion screw having a flow-rate variable at will permits great flexibility of use in combination with the pair of mixing and jellifying screws.

It is thus possible for example to obtain practically without interruption, conduits having a diameter which may be very large and with a structure completely free from any defect of uniformity.

Other characteristic features and advantages of the invention will furthermore be brought out in the description which follows below, given by way of example with reference to the accompanying drawings, in which:

FIG. 1 is a view in elevation illustrating diagrammatically an extrusion machine according to the invention;

FIG. 3 is a view to an enlarged scale of the portion enclosed and indicated by III in FIG. 2;

FIG. 4 is a view similar to that preceding of the portion enclosed and indicated at IV in FIG. 2;

Figure 2:
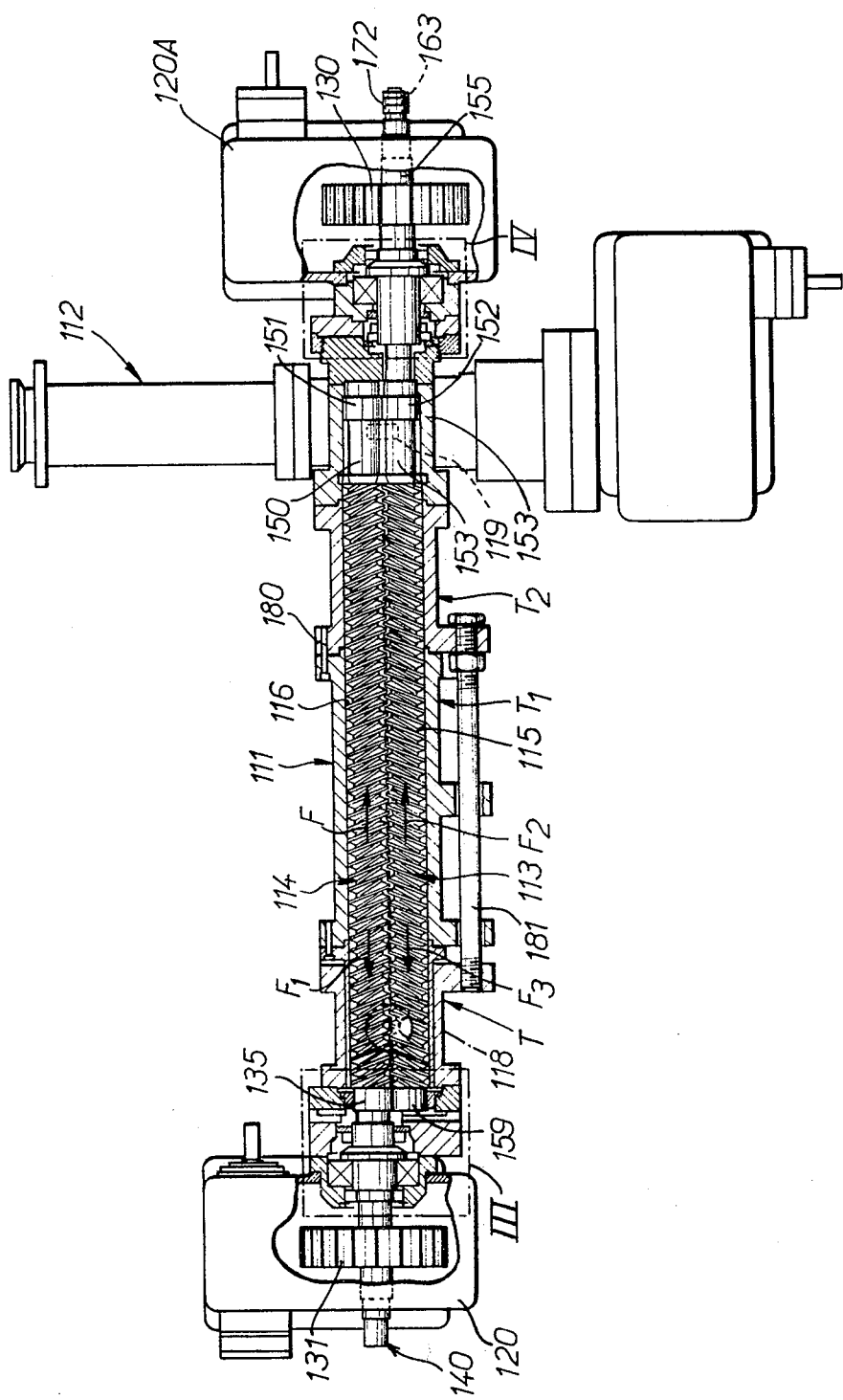
FIG. 2 shows a plan view of an extrusion machine comprising the improvements according to the invention.
Figure 9:
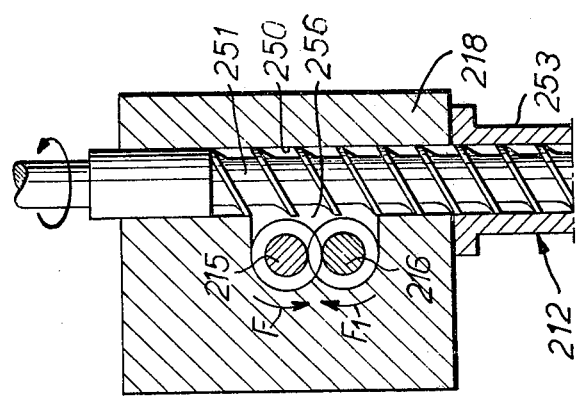
Figure 6:
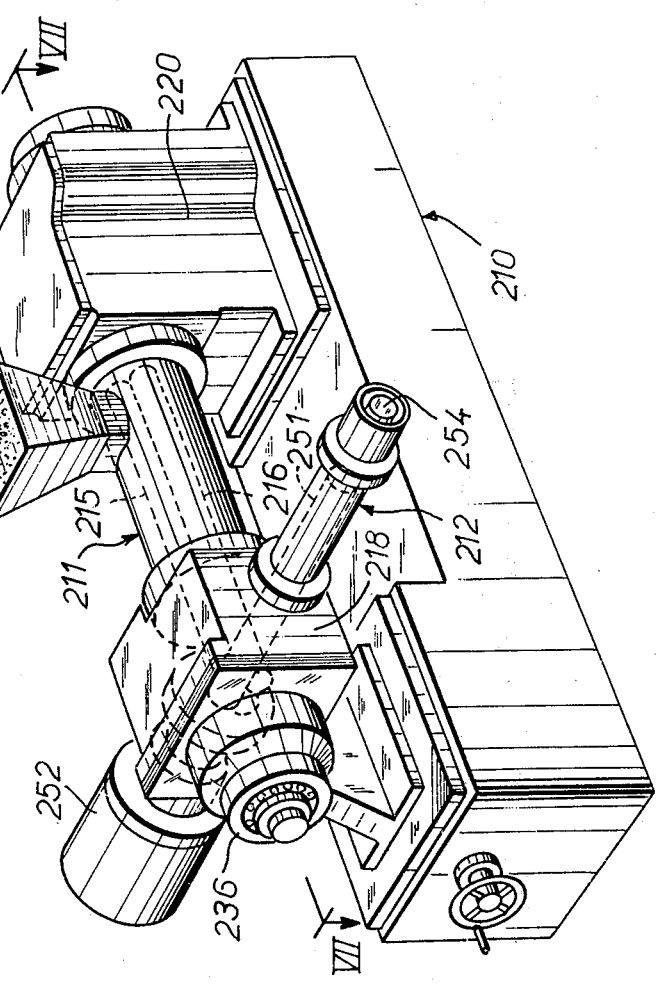
Figure 7:
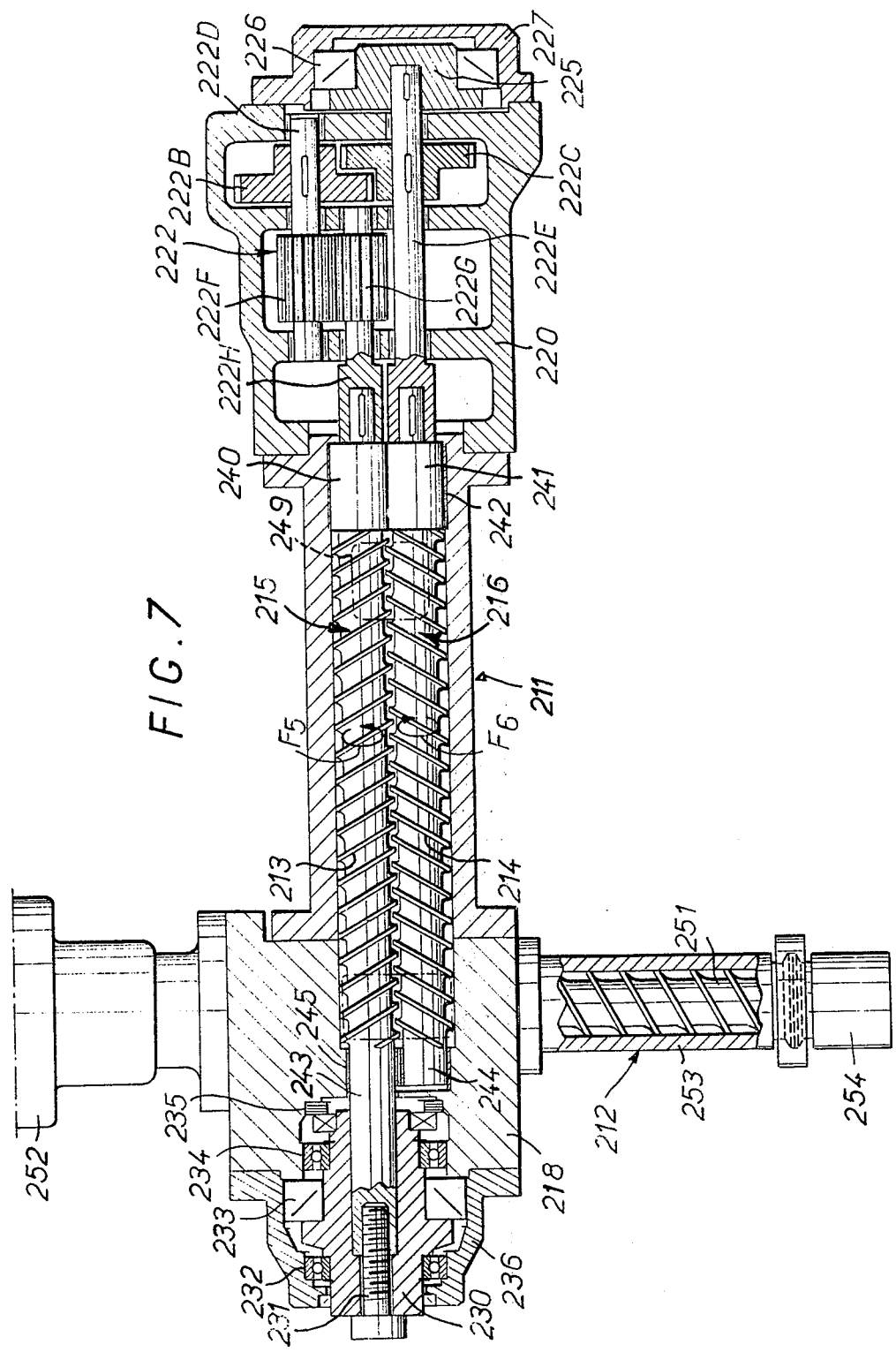
Figure 8:
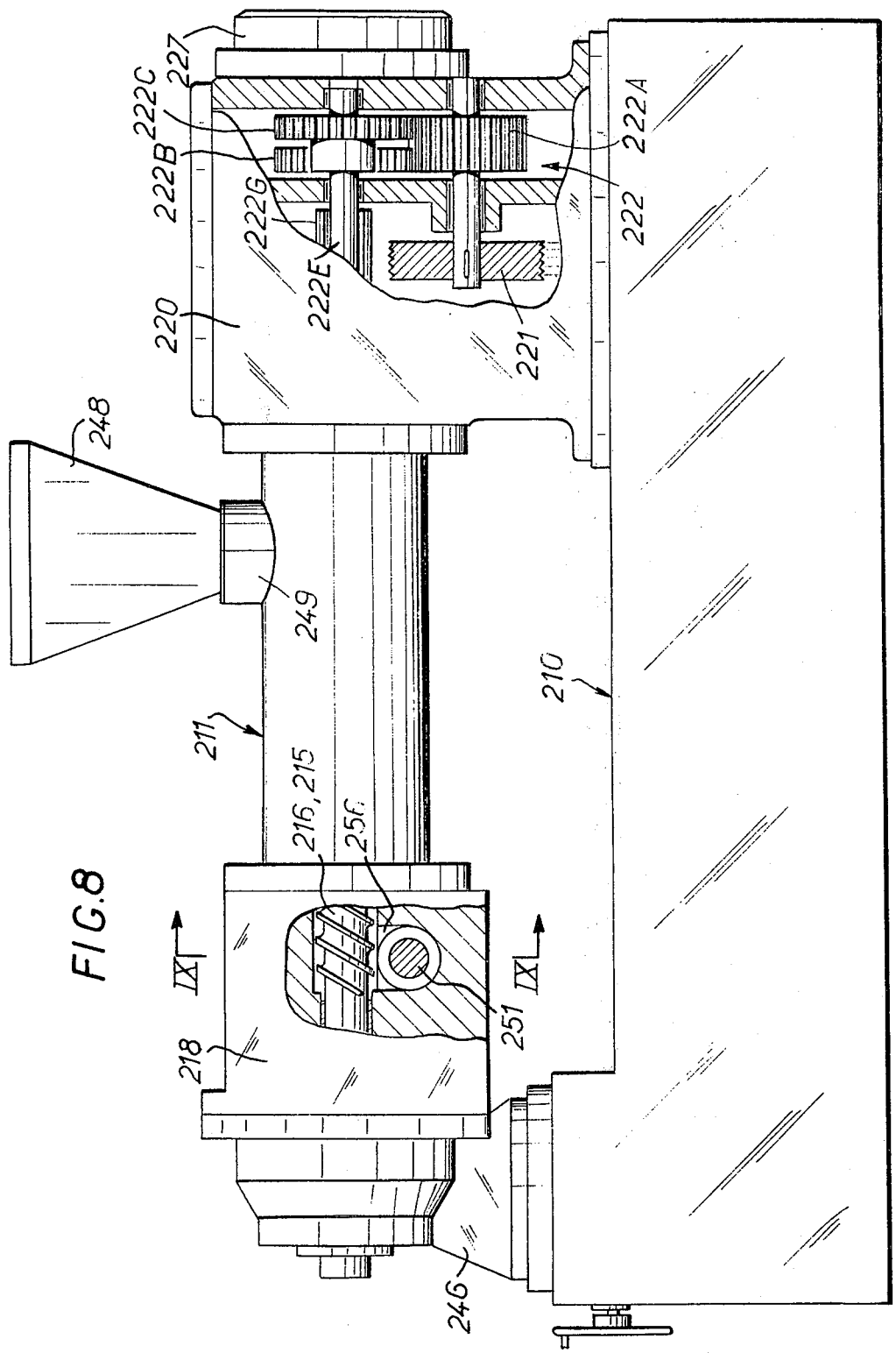

and FIG. 5 is a view to a larger scale of the portion enclosed and indicated at V in FIG. 3;

FIG. 6 is a perspective view of an alternative form of construction;

FIG. 7 is a view in horizontal cross-section, taken along the line VII—VII of FIG. 6;

FIG. 8 is a front view in elevation with parts broken away;

FIG. 9 is a transverse section taken along the line IX—IX of FIG. 8.

In the form of embodiment chosen and shown in FIGS. 1 to 5, the extrusion machine according to the invention comprises two cylindrical bodies 111, 112 respectively which cross each other substantially at right angles horizontally.

The cylindrical body 111 houses a pair of screws 113—114, the threads of which 115—116 are of opposite pitch and engaged with each other. The material to be extruded is supplied from a hopper T in a place indictaed diagrammatically at 118 (in the left-hand side of FIG. 1) while a passage chamber 119 towards the cylindrical body 112 is clearly visible from FIGS. 1 and 4.

The cylindrical bodies 111 and 112 are carried by and so to speak suspended from casings 120—120A, each housing a transmission of reduction gears (not shown here because they are shown per se).

As can be seen especially from FIG. 1, a common driving motor 122 mounted substantially below the cylindrical body 111 comprises two axial outlet shafts 123—124 of opposite directions and which are each arranged to drive, by means of conventional couplings 125, the above-mentioned reduction gears, the output pinions of which are adapted to engage respectively (see FIG. 2) with driving wheels 130—131 of the screws 113—114.

As can clearly be seen especially from FIGS. 3, 4 and 5, beyond the last threads 116, the screw 114 is provided with a bearing surface 133 which is mounted to rotate in a bearing 134. In the extension of this bearing surface is arranged a cylindrical section of revolution 136 followed by a second cylindrical section of revolution 137 having a diameter smaller than the preceding and which thus forms a supporting shoulder 138 intended to co-operate with a corresponding portion 139 provided in a sleeve indicated as a whole at 140.

The cylindrical section 137 and in consequence the screw 114 are keyed for rotation with the sleeve 140 by a key 141; the sleeve 140 is guided in rotation by two bearings 144 mounted in the reduction gear casing 120, and it is maintained axially by the abutment 143 which is itself retained by the supporting member 142.

Thus, the screw 114 conveys and mixes the material provided from the supply 118 in the direction indicated by the arrow F. The reaction of the material on the threads of the screw apply to this latter forces directed axially in the direction of the arrow F1, and these forces are absorbed by the abutment assembly described above.

With regard to the screw 113, the threads 115 of which are imbricated in the threads 116 of the screw 114, this is in abutment in the casing 126A in the manner which will now be described with reference to FIG. 4.

Beyond a cylindrical section 150, the other extremity of the screw 114 has a bearing surface 151 which is intended to co-operate with a surface 152 of the screw 113, these two bearing surfaces being rotatably mounted in a bearing 153. On the nearer side of the above-mentioned bearing surface 152, the screw 113 comprises a cylindrical section 154, while on the other side of the bearing surface 152, this screw 113 comprises an axial extension 155. It should be noted that the sections 150 and 154 form with the walls of the body, passages 156 located level with the passage chamber 119, and the axial extension 155 is keyed by a key 157 on a sleeve 158 on which is fixed the wheel 130.

The above sleeve is carried by a supporting member 159 fixed on the casing 120A; it is guided in rotation by two bearings 150 provided in the reduction gear unit 120A and retained axially by an abutment 161.

At its other extremity which can be seen in FIG. 3, the screw 113 comprises a bearing surface 165 intended to co-operate with the bearing surface 133 of the screw 114 and with the bearing 134. Sealing joints (not indicated) are also provided so as to prevent the ingress of material into this portion of the machine.

It should be noted that the sleeve 158 comprises a bore 166 in which is engaged a rod 167 threaded at its extremities at 163–170 (see FIGS. 2 and 4) so that on the one hand it can be screwed into a tapped portion 170 of the extension 155, while at the other extremity this rod receives a regulating nut 172.

An arrangement of this kind permits the blocking in abutment of the screw 113 and permits its maintenance in a chosen position.

The material is brought in at 118 and is conveyed in the direction of the arrow F2 by the threads 115, the reaction being directed as previously in the direction indicated by the arrow F3.

Thus, as will be readily understood, the screws being immobilized axially and driven in opposite directions, one of them, the screw 114, works in the present case in compression, while the other, the screw 113, works under tension.

It will be understood that such arrangements distribute the stresses over the machine in a remarkable manner.

Furthermore, the position and the overall size of the reduction gear units is no longer limited and permits the use of robust equipments which do not necessitate any maintenance.

The cylindrical body 111 may advantageously be provided in a number of sections $T, T_1, T_2$, etc., positioned by pins 180 and assembled by tie-rods 181.

A construction of this kind thus permits mixing and conveyance of the material under remarkable conditions of uniformity and efficiency, from the supply 118 up to the passage chamber 119, at which the pulp obtained is conveyed by the extrusion screw housed in the second cylindrical body 112, up to the extrusion head.

Reference will now be made more particularly to FIGS. 6 to 9 which illustrate an alternative form of construction.

In this form of construction, the extrusion machine comprises essentially, on a base 210, two cylindrical bodies 211 and 212 respectively, which cross substantially at right angles horizontally.

As is clearly shown, in particular in FIG. 7, the upper cylindrical body 211 houses a pair of screws 213 and 214, parallel and having their threads 215 and 216 in engagement.

The cylindrical body 211 is associated with a base 218 fixed on the body 212, and at one extremity it receives a casing 220 adapted internally so as to form a gear-box receiving its driving movement froma pulley 221 driven in any suitable manner by a driving device (not shown here since well known per se).

IN the gear-box 220, the pinions, indicated as a whole by the reference 222, are arranged in such manner as to ensure the rotational drive of the screws 215 and 216 in opposite directions, as illustrated by the arrows F5 and F6.

Preferably, the pulley 221 drives in rotation a pinion 222A, which engages in its turn with pinions 222B, 222C, one of which is keyed on a free shaft 222D and the other on a driving shaft 222C of the screw 216.

The free shaft 222D carries a pinion 222F adapted to engage with a similar pinion 222G keyed on a driving shaft 222H of the screw 215.

There is obtained in this way, from the single driving pulley 221, rotation of the screws 215 and 216 in opposite directions and at the same circumferential speed.

One of the screws, in this case the screw 216, is in axial abutment (at the right-hand side of FIG. 7) through the intermediary of a supporting cup 225 and an abutment 226 with rollers, against a cover 227 mounted on the free extremity of the gear casing 220, which is in turn associated in any suitable manner with the frame 210 of the machine.

With regard to the other screw 215, this is rotatably mounted in the base 218 of the second cylindrical body by means of a bearing surface 230 connected by screws 231 to the screw 215. The screw 215 is rotatably mounted in the base 218 on two bearings 232 and 234, and it is retained axially by the roller thrust bearing 233. The bearing 232 and the thrust bearing 233 are housed in a cap 236 forming a bearing support.

For the purpose of obtaining fluid-tightness between the base 218 and the bearing surface 230, a sealing joint 235 is provided.

On the side of the gear casing 220, fluid-tightness between the screws 215, 216 and the first cylindrical body is ensured by cylindrical sections of revolution, respectively 240 for the screw 215 and 241 for the screw 216, having their generator lines in contact and adapted to move in a journal bearing 242. A similar mounting is provided towards the other extremities of the screws by means of cylindrical sections of revolution 243 and 244, which rotate in a bearing sleeve 245 housed in a bore in the base 218 rigidly fixed on the bed-plate 210, for example by means of a gusset 246 (see particularly FIGS. 6 and 8).

The first cylindrical body 211 comprises a feed hopper 248 extending vertically and arranged in the vicinity of the gear-casing 220 in such manner that its base 249 is located above the screws 215 and 216.

The base 218 comprises a drilled hole 250 directed perpendicularly to the screws 215 and 216, and in which is arranged an extrusion screw 251 which is driven at one extremity by a driving means 252, coupled to the base in any suitable manner, and which extends on the opposite side into a sheath 253 which is also fixed in any suitable manner on the base 218. At its free extremity, the sheath is provided with an extrusion head 254 of known type.

As is clearly shown, especially in FIG. 9, the screws 215 and 216 are substantially tangential to the extrusion screw 251, and at their crossing point, the base 218 forms a passage chamber 256 which is advantageously utilized so as to form a de-aeration means for the jellified material.

In operation, when the hopper 248 delivers material in powder or granular form above the screws 215 and 216, the latter by their rotation in opposite directions, ensure the mixing and the conveyance of the material towards the passage chamber 256, in which it is jellified and transferred into the extrusion screw 251, which in its turn brings the product without discontinuity under pressure to the extrusion head 254.

In view of the bearing arrangements for the pair of screws 215 and 216 which are in fact not limited in practice as to their dimensions, mixing screws are obtained which are capable of absorbing particularly large axial forces.

The invention is of course not limited to the forms of construction chosen and shown solely by way of example, and it is on the contrary capable of receiving various modifications without thereby departing from the scope of the present invention.

Thus, the cylindrical bodies may advantageously be formed in a single piece and may comprise bores for the said screws and a suitably profiled passage chamber.

What we claim is:

1. An extrusion machine comprising a pair of screws of opposite pitch having axes thereof disposed in generally parallel relationship, a housing within which said screws are disposed, inlet means through which material is introduced into said housing, outlet means through which material exists from said housing, means for rotating said screws in opposite directions such that the opposite pitch thereof delivers material in a direction from said inlet means toward said outlet means and establishes reaction forces in a direction from said outlet means toward said inlet means, said screws each having axially opposite ends, means at one end of a first of said screws axially compressively resisting axial movement of said first screw in a direction away from said outlet means as a result of the reaction forces imposed thereupon, means at one end of a second of said screws axially tensionally resisting axial movement of said second screw in a direction away from said outlet means as a result of the reaction forces imposed thereupon equalized stress distribution of said reaction forces is achieved, said one end of said first screw is axially remote from said one end of said second screw, and the remaining ends of said first and second screws are also axially remote from each other.

2. The extrusion machine as defined in claim 1 wherein said resisting means of said first screw is disposed remoate from said outlet means.

3. The extrusion machine as defined in claim 2 wherein said first screw resisting means includes means mounting thrust bearing means between said housing and said first screw one end.

4. The extrusion machine as defined in claim 3 wherein said second screw resisting means includes means mounting thrust bearing between said housing and said second screw one end 5. The extrusion machine as defined in claim 4 wherein each of said one ends has rotationally fixed thereto a sleeve having an annular shoulder, and the respective thrust bearing means surrounds the respective sleeve and is retained in position by its respective shoulder.

6. The extrusion machine as defined in claim 5 wherein said second screw one end includes an exteriorly threaded extension, said threaded extension passes through its associated sleeve, and a nut threaded upon said extension for axially adjusting the sleeve associated with said second screw one end.

7. The extrusion machine as defined in claim 5 wherein each thrust bearing means is sandwiched between its associated sleeve annular shoulder and an opposing shoulder of said housing.

8. The extrusion machine as defined in claim 6 wherein each thrust bearing means is sandwiched between its associated sleeve annular shoulder and an opposing shoulder of said housing.

9. The extrusion machine as defined in claim 4 including a second housing disposed transverse to said first housing, an extrusion screw in said second housing, and said outlet means placing said first and second housings in communication with each other.

10. The extrusion machine as defined in claim 2 including a second housing disposed transverse to said first housing, an extrusion screw in said second housing, and said outlet means placing said first and second housings in communication with each other.

11. The extrusion machine as defined in claim 1 wherein said resisting means of said second screw is disposed adjacent to said outlet means.

12. The extrusion machine as defined in claim 11 wherein said second screw resisting means includes means mounting thrust bearing means between said housing and said second screw one end.

13. The extrusion machine as defined in claim 11 including a second housing disposed transverse to said first housing, an extrusion screw in said second housing, and said outlet means placing said first and second housings in communication with each other.

14. The extrusion machine as defined in claim 1 wherein said resisting means of said first and second screws are disposed respectively remote from and adjacent to said outlet means.

15. The extrusion machine as defined in claim 14 including a second housing disposed transverse to said first housing, an extrusion screw in said second housing, and said outlet means placing said first and second housings in communication with each other.

16. The extrusion machine as defined in claim 1 including a second housing disposed transverse to said first housing, an extrusion screw in said second housing, and said outlet means placing said first and second housing in communication with each other.

* * * * *

UNITED STATES PATENT AND TRADEMARK OFFICE
CERTIFICATE OF CORRECTION

PATENT NO. : 3,907,259
DATED : September 23, 1975
INVENTOR(S) : Daniel Jules Leclercq It is certified that error appears in the above-identified patent and that said Letters Patent are hereby corrected as shown below:

Under the heading "Foreign Application Priority Data" insert:

January 10, 1972      France..................72/00588
December 29, 1972     France..................72/46933

Signed and Sealed this

*thirtieth* Day of *December 1975*

[SEAL]

Attest:

RUTH C. MASON
*Attesting Officer*

C. MARSHALL DANN
*Commissioner of Patents and Trademarks*